United States Patent [19]

Johnson et al.

[11] 3,865,536
[45] Feb. 11, 1975

[54] TRAVELING INTERNAL CONDUIT SUPPORT

[76] Inventors: B. Neil Johnson, 10811 Newcombe Ave., Whittier, Calif. 90605; Robert A. Midthun, 1404 Tustin, Santa Ana, Calif. 92700

[22] Filed: Apr. 18, 1974

[21] Appl. No.: 462,085

Related U.S. Application Data

[63] Continuation of Ser. No. 248,649, April 28, 1972, abandoned.

[52] U.S. Cl. ............... 425/472, 425/460, 425/376
[51] Int. Cl. .................. B28b 17/00, B28b 21/00
[58] Field of Search ....... 425/59, 63, 460, 403, 472, 425/376; 72/75; 61/72.7

[56] References Cited
UNITED STATES PATENTS

| | | | |
|---|---|---|---|
| 354,429 | 12/1886 | McMullin | 61/72.7 |
| 1,010,954 | 12/1911 | Rasmussen et al. | 72/75 |
| 2,298,839 | 10/1942 | Porter | 425/63 |
| 2,948,942 | 8/1960 | Gordon | 425/59 |
| 3,201,827 | 8/1965 | Reynolds et al. | 425/403 X |
| 3,384,940 | 5/1968 | Barton | 425/460 X |
| R21,164 | 7/1939 | Tate | 425/460 |

*Primary Examiner*—Francis S. Husar
*Assistant Examiner*—David S. Safran
*Attorney, Agent, or Firm*—Boniard I. Brown

[57] ABSTRACT

A traveling internal conduit support having at least one carriage movable through the conduit passage, and conduit wall engaging means such as rollers about the carriage for engaging and internally supporting the conduit wall as the carriage travels forwardly through the conduit. The carriage has couplings at its ends for pivotally connecting two or more similar carriages in end to end tandem relation to provide a traveling articulated conduit support of any desired length capable of passing through a curved conduit. The conduit support may be pivotally coupled to the rear end of a traveling cementitious conduit extruding machine for internally supporting the extruded conduit wall until the wall sets sufficiently to be self-supporting. The support may also be used to internally support a plastic or metal conduit laid within a trench during back filling of the trench.

12 Claims, 6 Drawing Figures

PATENTED FEB 11 1975  3,865,536

TRAVELING INTERNAL CONDUIT SUPPORT

This is a continuation of application Ser. No. 248,649, filed Apr. 28, 1972, now abandoned.

RELATED APPLICATIONS

Reference is made of our co-pending application Ser. No. 220,258, filed Jan. 24, 1972, and entitled "Method and Machine for Forming A Continuous Seamless Concrete Pipe".

BACKGROUND OF THE INVENTION

1. Field of the Invention

This invention relates generally to the field of conduit installations of the type used for irrigation, flood control, sewage disposal, and other similar purposes. The invention relates more particularly to a traveling internal conduit support for aiding the installation of such conduits.

2. Discussion of the Prior Art

One method of installing a conduit of the class described involves extruding the conduit within a trench from a suitable cementitious material. Conduit extruding machines for this purpose are disclosed in our above mentioned copending application and in U.S. Pat. No. 3,091,013. Extruding machines for this purpose are propelled in some fashion through a trench and equipped with means for extruding an annular conduit wall forming ribbon of cementitious material from the rear end of the machine as the latter advances forwardly through the trench. Another method of conduit installation involves placing prefabricated sections of plastic or metal conduit within a trench and joining the sections end to end.

These methods of conduit installation present certain problems with which the present invention is concerned. Generally speaking, the problems referred to involve internally supporting the conduit wall. Thus, when installing a conduit by the described extrusion technique, it is necessary to internally support the conduit wall until the latter sets sufficiently to be self-supporting. In the past, this has been accomplished by placing stationary supports within the extruded conduit. This method of support has many disadvantages, however. Foremost among these disadvantages are the excessive labor time and cost of installing and removing the supports, and marring of the internal conduit wall surface by the supports and workmen who install the supports. When installing plastic and metal conduits, it is often necessary to internally support the conduit wall during backfilling of the trench containing the conduit in order to prevent deflection or buckling of the wall under the weight of the backfill material.

SUMMARY OF THE INVENTION

The present invention provides a novel traveling support for internally supporting both extruded and preformed conduits during their installation. The support is composed of a basic carriage unit which is movable through the interior passage of a conduit immediately following its extrusion in the case of an extruded cementitious conduit and during backfilling of the conduit trench in the case of a plastic or metal conduit. Spaced about and along the carriage are conduit wall engaging means which engage and internally support the conduit wall as the conduit support advances through the conduit. In the particular conduit support described herein, these conduit wall supporting means are rollers with resilient tires, such as pneumatic tires.

According to a feature of the invention, the support carriage has coupling means at its ends for pivotally connecting two or more of the carriages in tandem end to end relation to provide a conduit support of any desired length. This feature permits the effective residence time of the support within any given portion of the carriage to be varied independently of the rate of movement of the support through the conduit. Accordingly, the conduit may be internally supported for whatever length of time is necessary to render the conduit totally self-supporting. Since the several carriages of the support are pivotally joined, the support is capable of movement through curved portions of a conduit regardless of the overall length of the support.

According to another feature of the invention, the conduit wall engaging rollers of the support are adjustable radially of the support carriage to accommodate the support to a range of conduit diameters and cross-sectional shapes.

When the present support is employed to internally support an extruded pipe, the support is pivotally connected to the rear end of the conduit extruding machine so as to travel forwardly in unison with the machine and internally support the conduit wall immediately following its extrusion. In the case of plastic or metal conduit installation, the support is moved through the conduit in any convenient way so as to always be located within the region where the conduit trench is being backfilled.

DESCRIPTION OF THE PREFERRED EMBODIMENT

Figure 1:
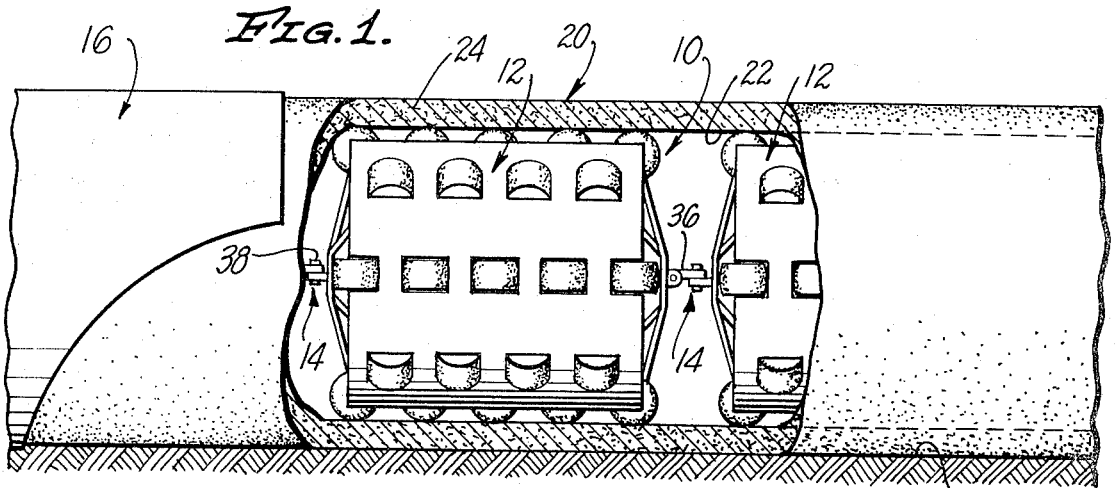
FIG. 1 is a conduit support according to the invention within an extruded cementitious conduit.
Figure 2:
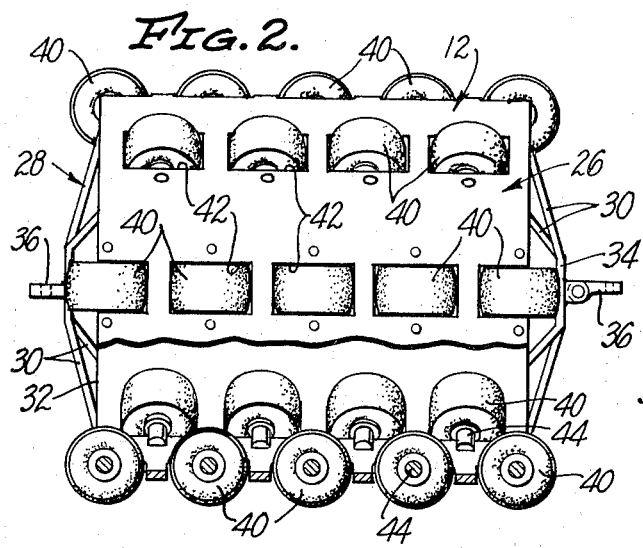
FIG. 2 is an enlarged side elevation of one carriage of the conduit support.
Figure 3:
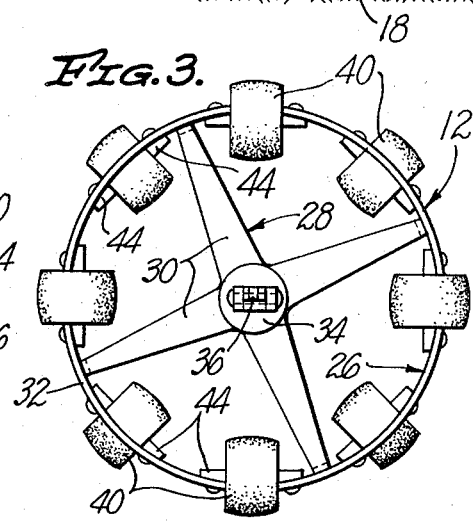
FIG. 3 is an end view of the carriage in FIG. 2.

The conduit support 10 illustrated in FIGS. 1 to 3 has a number of carriages 12 pivotally joined in tandem end to end relation by coupling means 14 on the carriage ends. The leading carriage is pivotally connected to the rear end of a conduit extruding machine 16 of the kind disclosed in our earlier mentioned copending application. Machine 16 is propelled forwardly by means, not shown, through a trench 18 which has been previously excavated along the route to be followed by a conduit. As the machine travels along the trench, it extrudes an annular ribbon of cementitious material from the rear end of the machine to form a conduit 20 within the trench. The present support 10 moves forwardly with the conduit extruding machine, within the central passage 22 in the extruded conduit, and internally supports the conduit wall 24 until the latter sets sufficiently to be self-supporting.

The conduit support carriages 12 are essentially identical so that a description of one will suffice for all. Carriage 12 has a tubular frame 26 constructed of a boiler plate or the like. At the ends of the carriage frame are spiders 28 having arms 30 whose arms are welded or otherwise rigidly attached to the cylindrical wall 32 of carriage frame 26. Each spider has a central hub 34 mounting one part 36 of the carriage coupling means 14. The illustrated coupling parts 36 are hinged coupling tongues having holes for receiving coupling pins 38. Adjacent carriages 12 are joined by placing their adjacent coupling tongues 36 in overlapping relation and inserting the coupling pins 38 through the tongue holes.

Each carriage 12 of the conduit support 10 has conduit wall engaging means 40 spaced circumferentially about and longitudinally along the carriage frame wall 32. The illustrated wall engaging means are rollers positioned within longitudinal slots 42 in the frame wall. Each roller is rotatably supported by bearings 44 fixed to the inner wall surface at opposite sides of the corresponding slot 42. Rollers 40 project approximately equal distances beyond the outer wall surface and are disposed in radial planes containing the central longitudinal carriage axis. According to the preferred practice of the invention, the rollers 40 have resilient treads or tires, such as pneumatic tires.

In use, the conduit support 10 is coupled to the rear end of the conduit extruding machine 16 so as to follow the machine through the trench 18. The support moves through the central passage 22 of the conduit 20 extruded rearwardly from the machine. The support rollers 40 ride on the inner surface of the conduit wall 24 to support the wall against inward deflection or collapse until the cementitious material of the wall has set sufficiently to render the wall self-supporting. In this regard, a feature of the invention resides in the fact that the conduit support 10 may comprise any number of carriages 12 coupled end to end. The residence time of the support within each portion of the conduit 20 thus be regulated independently of the rate of movement of the support through the conduit by adding or removing carriages. Accordingly, the residence time may be made sufficiently long to allow the conduit wall to become self-supporting without changing the rate of movement of the extruding machine 16 which may have some optimum value unrelated to the setting time of the extruded conduit. Since the carriages 12 are pivotally joined, the support 10 can pass freely through curved portions of the conduit 20 regardless of the overall length of the support.

Figure 4:
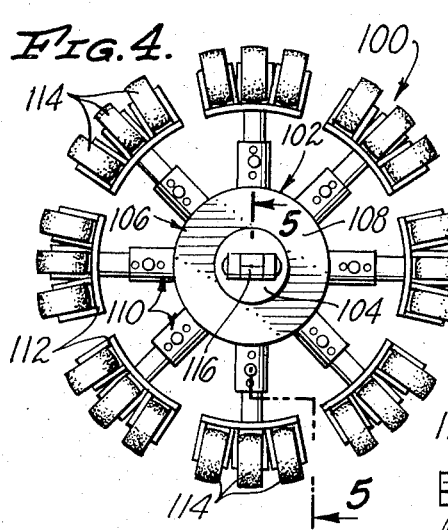
FIG. 4 is an end view of a modified conduit support carriage according to the invention.
Figure 5:
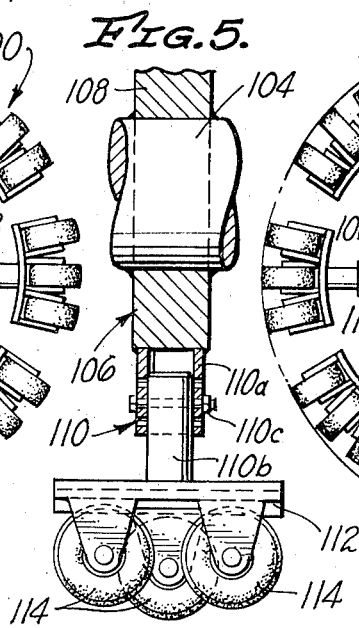
FIG. 5 is an enlarged section taken on line 5—5 in FIG. 4.
Figure 6:
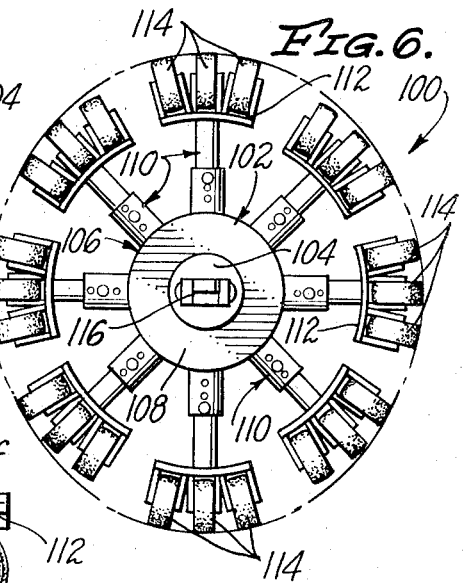
FIG. 6 is a view similar to FIG. 4 illustrating an adjustable feature of the carriage.

FIGS. 4–6 illustrate a modified carriage 100 for conduit support according to the invention. Carriage 100 has a frame 102 including a central longitudinal bar 104 mounting fixed spiders 106 (only one shown) at positions uniformly spaced along the bar. Each spider 106 has a central hub 108 receiving and fixed to the bar 104 and uniformly spaced arms 110 extending radially from the hub. Fixed to the outer end of each spider arm 110 is a bracket 112 mounting a number of conduit wall engaging means 114 which again are shown as rollers. The rollers on each bracket are disposed in radial planes containing the longitudinal axis of the carriage frame bar 104 and are spaced circumferentially and longitudinally of the carriage, as shown. Each roller bracket 112 is curved to support rollers 114 with their outer surfaces generally tangent to a common circular arc generated about the frame bar axis at a radius approximating the internal radius of the conduit to be supported. On the ends of the frame bar 104 are coupling means 116 for pivotally connecting the carriage 100 to other similar carriages and/or the conduit extruding machine 16 as are the carriages 12 in FIGS. 1–3.

A feature of the modified conduit support carriage 100 resides in the fact that its spider arms 110 are individually adjustable in length to adjust the effective cross-sectional configuration of the carriage, as shown in FIGS. 4 and 6. To this end, each arm has telescoping sections 110a, 110b releasably joined by fastening means 110c which permit the arm sections to be secured in various relative axial positions. The illustrated fastening means comprise bolts which are selectively insertable through a number of axially spaced holes in the arm sections.

The conduit support 100 is used in the same way as the support 10 in FIGS. 1–3 except that the support rollers 114 may be radially adjusted to different conduit diameters and shapes.

As noted earlier, the present conduit supports 10, 100 may be used to internally support a plastic or metal conduit against inward deflection or buckling of the conduit wall during backfilling of the trench containing the conduit. In this application, the support is moved or otherwise moved through the conduit in any convenient way at a speed such that support is always located within the region of the trench being backfilled. The conduit support 100 of FIGS. 4–6 is particularly adapted to this latter application since its rollers 114 may be adjusted to internally support the conduit in a variety of circular, oval, and other cross-sectional shapes, as illustrated in FIGS. 4 and 6, until backfilling is completed. The backfill material will then retain the conduit shape. The conduit wall engaging surfaces of the support rollers 40, 114 are preferably curved transversely to approximately the same radius as the supported conduit and have a substantial width compared to the radii of the rollers so as to provide maximum support for the roller conduit wall.

What is claimed as new in support of Letters Patent is:

1. A traveling internal support for a conduit comprising:
    at least one carriage having a longitudinal axis and movable in a direction of said axis through the interior passage of said conduit, said carriage including a frame conduit wall engaging rollers rotatable on fixed axes transverse to said carriage axis and spaced about the full circumference of said carriage in a manner such that rollers are located at the bottom, sides, and top of said carriage for engaging and rolling along the floor, sides and top of the conduit wall to internally support the wall as the carriage travels through said conduit passage, and said rollers having peripheral conduit wall engaging surfaces of substantial width compared to the roller radius.

2. A conduit support according to claim 1 wherein: said rollers are spaced lengthwise of as well as circumferentially about said carriage.

3. A conduit support according to claim 2 wherein: the peripheral conduit wall engaging surfaces of said rollers have a transverse convex curvature of approximately the same radius as the conduit wall.

4. A conduit support according to claim 1 wherein: said rollers comprise resilient rollers.

5. A conduit support according to claim 1 including:

means for adjusting said rollers radially toward and away from the longitudinal axis of said carriage frame.

6. A conduit support according to claim 1 including:
coupling means on both ends of said carriage frame for pivotally connecting said carriage in tandem fashion to at least one additional carriage.

7. A traveling internal support for a conduit comprising:
at least one carriage movable longitudinally through the interior passage of said conduit including a frame and conduit wall engaging rollers spaced about the full circumference of and spaced longitudinally along said carriage and disposed in planes containing the longitudinal axis of said carriage in a manner such that there are rollers located at the bottom, sides and top of said carriage for engaging and rolling along the floor, sides, and top of the conduit wall to internally support the wall as the carriage travels through said conduit passage,
said carriage frame comprising a tubular frame having a cylindrical wall, and
said rollers protruding through slots in said frame wall and having resilient conduit wall engaging tires.

8. A traveling internal support for a conduit comprising:
at least one carriage movable longitudinally through the interior passage of said conduit including a frame and conduit wall engaging rollers spaced about the full circumference of said carriage and including rollers at the bottom, sides, and top of said carriage for engaging and rolling along the floor, sides, and top of the conduit wall to internally support the wall as the carriage travels through said conduit passage,
said carriage frame comprising a central longitudinal bar and spiders spaced along said bar having arms extending radially outward from said bar, and
said rollers being mounted on the outer ends of said arms and having resilient conduit wall engaging tires.

9. A conduit support according to claim 8 wherein:
each spider arm mounts a number of said rollers.

10. A conduit support according to claim 8 wherein:
each spider arm is longitudinally adjustable to adjust said rollers radially toward and away from said bar.

11. A conduit support according to claim 1 wherein:
said support comprises at least one additional carriage, and coupling means pivotally connecting said carriages in end to end tandem relation.

12. A traveling internal support for a conduit comprising:
at least one carriage movable longitudinally through the interior passage of said conduit including a frame and conduit wall engaging rollers having resilient conduit wall engaging tires spaced about the full circumference of said carriage and including rollers at the bottom, sides, and top of said carriage for engaging and rolling along the floor, sides, and top of the conduit wall to internally support the wall as the carriage travels through said conduit passage.

* * * * *